United States Patent [19]

Thro

[11] Patent Number: 4,570,265
[45] Date of Patent: Feb. 11, 1986

[54] RANDOM FREQUENCY OFFSETTING APPARATUS FOR MULTI-TRANSMITTER SIMULCAST RADIO COMMUNICATIONS SYSTEMS

[75] Inventor: Stuart W. Thro, Cary, Ill.

[73] Assignee: Motorola, Inc., Schaumburg, Ill.

[21] Appl. No.: 700,336

[22] Filed: Feb. 12, 1985

Related U.S. Application Data

[63] Continuation of Ser. No. 324,172, Nov. 23, 1981, abandoned.

[51] Int. Cl.[4] .................. H04B 15/00; H04B 7/02
[52] U.S. Cl. .................................... 455/52; 375/1;
    455/56; 455/59; 455/63; 455/102; 455/105
[58] Field of Search ................... 455/1, 28, 49-54,
    455/56, 57, 59, 63, 65, 102, 103, 105; 370/11;
    375/1, 2.1, 51, 57, 60

[56] References Cited

U.S. PATENT DOCUMENTS

| | | | |
|---|---|---|---|
| 3,475,558 | 10/1969 | Cahn | 455/57 |
| 3,597,689 | 8/1971 | Ferrell | 455/49 |
| 3,710,313 | 1/1973 | Kimball et al. | 455/1 |
| 3,862,365 | 1/1975 | Kobayashi et al. | |
| 4,032,846 | 6/1977 | Hirade et al. | |
| 4,057,758 | 11/1977 | Hattori et al. | |
| 4,188,582 | 2/1980 | Cannalte et al. | |
| 4,223,405 | 9/1980 | Hattori et al. | 455/105 |
| 4,231,113 | 10/1980 | Blasbalg | 375/1 |
| 4,255,814 | 3/1981 | Osborn | 455/51 |

FOREIGN PATENT DOCUMENTS 0027754 2/1980 Japan ...................... 455/51

OTHER PUBLICATIONS

"A New Modulation Scheme for Multitransmitter Simulcast Digital Mobile Radio Communication", by Takeshi Hattori, IEEE Transactions on Vehicular Technology, vol. VT-29, No. 2, May 1980, pp. 260-270, (1980 IEEE).

"A New Modulation Scheme for Multitransmitter Simulcast Digital Mobile Radio Communication" by T. Hattori and S. Ogose-IEEE V. T. Conference Mar. 27-30, 1979, Arlington Heights, IL, pp. 83-88.

"Wide Area Trunking-A System Configuration for Large Scale Radio Dispatch" by Stuart Thro, Motorola, Inc. Schaumburg, IL-ENTELEC Conference, Houston, Tex., Mar. 1981.

"Zener Diode Handbook" First Edition-Compiled by Applications Eng. Department of Motorola Semiconductor Products, Inc. 1967.

Primary Examiner—Marc E. Bookbinder
Attorney, Agent, or Firm—Rolland R. Hackbart; Edward M. Roney; James W. Gillman

[57] ABSTRACT

Apparatus for randomly offsetting the frequencies of each transmitter in a simulcast radio communications system is described. The random frequency offsetting apparatus includes a random noise source for generating a noise signal which is amplified and low-pass filtered before application separately or in combination with an information signal to the frequency modulation input of a corresponding transmitter. In frequency modulated systems, the noise signal and information signal are combined and modulated onto the transmitters; whereas, in envelope modulated systems, the noise signal is frequency modulated onto the transmitter, and the information signal is envelope modulated onto the transmitter. Since the frequency of each simulcasting transmitter is randomly varying, deep cancellation nulls created in the overlap areas between transmitters by multi-transmitter interference will be randomly distributed in randomly varying locations. Therefore, communications between a central station and remote stations located in the overlap areas will not be interrupted by the nulls for long periods of time, as was possible in prior art simulcast systems.

48 Claims, 4 Drawing Figures

RANDOM FREQUENCY OFFSETTING APPARATUS FOR MULTI-TRANSMITTER SIMULCAST RADIO COMMUNICATIONS SYSTEMS

This is a continuation of application Ser. No. 324,172, filed Nov. 23, 1981 abandoned.

BACKGROUND OF THE INVENTION

The present invention is related generally to simulcast radio communications systems, and more particulary to a method and apparatus for randomly offsetting the frequencies of each transmitter in a multi-transmitter simulcast radio communications system.

Simulcast radio communications systems typically include a plurality of radio transmitters having the same carrier frequency and each located at different geographical locations for simultaneously transmitting the same information signal to fixed, portable or mobile radios located throughout a large geographical area. The information signal transmitted to the radios can be digital, tone or voice signals. This information signal is modulated onto the carrier signal transmitted by each of the transmitters. In areas midway between two transmitters, commonly referred to as overlap areas, where information signals from both transmitters can be received, the received information signal can be degraded by differences in the transmitter modulation levels, delays or phases, or differences in transmitter frequencies. Furthermore, since radios in the overlap areas can receive two or more transmitter signals having approximately the same amplitude, deep cancellation nulls can occur when the transmitter signals are 180° out of phase with one another. Since both the modulation and frequency of the transmitter signals are highly correlated to minimize audio distortion, the deep cancellation nulls resulting from multi-transmitter interference that occurs in the overlap areas can last for a few seconds or as long as several minutes. Thus, radios located in a null can not receive information signals from the simulcasting transmitters for a long period of time.

The interruption of communications due to deep cancellation nulls of long duration can be alleviated somewhat by intentionally offsetting the frequency of the simulcasting transmitters. For example, the transmitter frequencies may be offset by 10 to 50 Hz relative to one another. Although this transmitter frequency offsetting technique insures that any deep cancellation nulls that do occur are of very short duration, it also creates an audible beat frequency having a repetition rate equal to the frequency difference between the transmitter signals. This beat frequency may be acceptable in some data communications systems, but it is very annoying to the receiving party in voice communications systems. Thus, there is a long felt need for a way of substantially reducing the information signal degradation due to the deep cancellation nulls occurring in the overlap areas between one or more transmitters in simulcast radio communications systems.

SUMMARY OF THE INVENTION

Accordingly, it is the object of the present invention to provide improved frequency offsetting apparatus that randomly offsets the frequency of each transmitter in a multi-transmitter simulcast radio communications system.

It is another object of the present invention to provide improved random frequency offsetting apparatus that substantially reduces the degradation of both digital and analog signals received at remote stations of a simulcast radio communications system.

It is another object of the present invention to provide improved frequency offsetting apparatus for randomly offsetting each transmitter in a simulcast radio communications system so that deep nulls resulting from transmitter signal cancellation do not remain stationary but instead move around in a random manner in the overlap areas between simulcasting transmitters.

In an embodiment of the present invention, each transmitter in a multi-transmitter simulcast radio communications system includes a signal source for generating a noise signal having a random amplitude and random frequency. In frequency modulated systems, the noise signal from the signal source is combined with information signals, which may be digital, tone, voice, or analog signals, and the combined signals are frequency modulated onto the corresponding transmitter. In systems where envelope modulation techniques are used for the information signal, only the noise signal is frequency modulated onto the corresponding transmitter. The noise signal causes the frequency of each transmitter to randomly vary by a pre-selected amount, such as, for example, ±50 Hz. Since the frequency of each transmitter is randomly varying, deep cancellation nulls that may be created by multi-transmitter interference are randomly moved throughout the overlap areas between the simulcasting transmitters such that the nulls only occur at any given location for short periods of time. Therefore, communications with remote stations operating in the overlap areas will not be interrupted for long periods of time.

DETAILED DESCRIPTION OF THE PREFERRED EMBODIMENT

Figure 1:
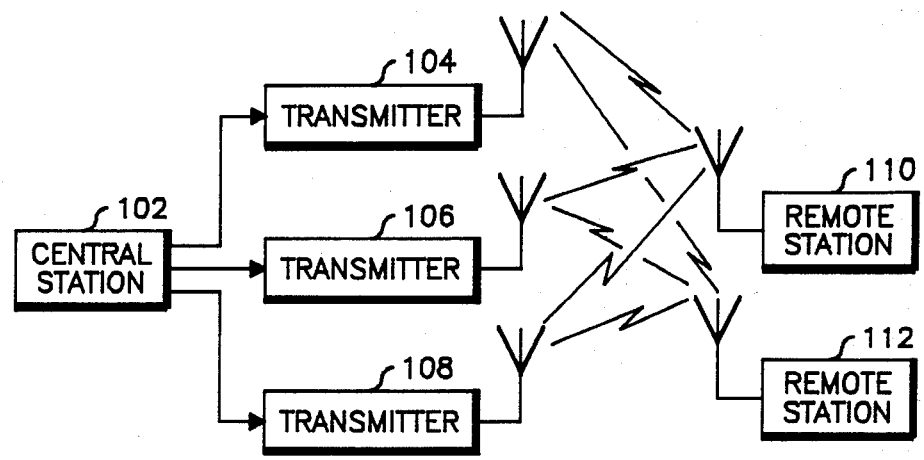
FIG. 1 is a block diagram of a typical simulcast radio communications system that may advantageously utilize the present invention.

In FIG. 1, there is illustrated a simulcast transmission system for communicating information signals between central station 102 and a plurality of remote stations 110 and 112. Central station 102 is coupled to a plurality of radio transmitters 104, 106 and 108 which are enabled to transmit the same information signals at the same carrier frequency. The carrier signal of transmitters 104, 106 and 108 can be frequency modulated or envelope modulated by the information signal depending the type of modulation adopted for all radios in each particular simulcast transmission system. Remote stations 110 and 112 may include radio transceivers for receiving information signals from transmitters 104, 106 and 108 and transmitting information signals to receivers (not shown) which are also coupled to central station 102.

The frequency of transmitters 104, 106 and 108 must be substantially identical and are typically based on a rubidium frequency standard or are phase and frequency sychronized to the same reference signal as described in U.S. Pat. No. 4,188,582. Transmitters 104, 106 and 108 may be geographically separated so that an operator at central station 102 can communicate to remote stations 110 and 112 throughout a rather large geographical area. The characteristics of such simulcast systems are further described in my paper entitled "Wide Area Trunking—A System Configuration For Large Scale Radio Dispatch", presented at the ENTE-LEC Conference held at Houston, Tex. in March 1981.

In the overlap areas between two or more simulcasting transmitters, deep cancellation nulls can be created when the transmitter signals have approximately the same amplitude and are 180° out of phase with one another. These nulls interrupt the communications path between the central station 102 and the remote station 110 or 112 located in the overlap areas for periods of time that may last from a few seconds to a few minutes. Since both the frequency and the modulation of the transmitter signals are very highly correlated with one another, the resultant nulls remain substantially fixed in geographical location for long time periods. Thus, if a remote station 110 or 112 stops in a null or is fixedly located in a null, communications with that remote station can likewise be interrupted for long periods of time. Such interruptions can cause the remote stations to miss vital communications.

By utilizing the present invention, the deep cancellation nulls created by multi-transmitter interference will be randomly distributed in randomly varying locations throughout the overlap areas so that communications between the central station 102 and remote stations 110 and 112 will not be interrupted for long periods of time. The location of the nulls in the overlap areas is randomly varied by utilizing the random frequency offsetting apparatus of the present invention, which frequency modulates each transmitter with a random noise signal.

Figure 2:
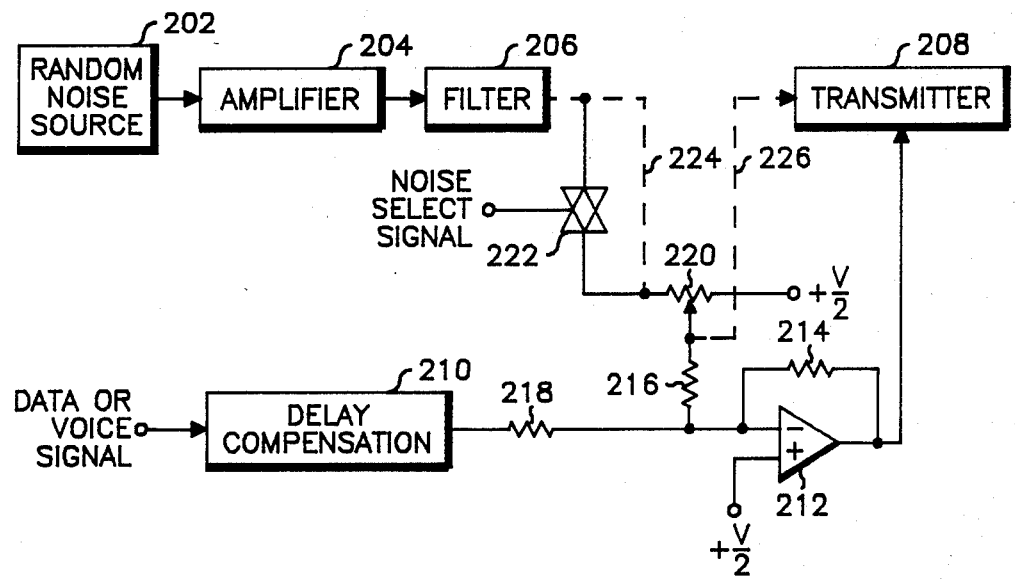
FIG. 2 is a block diagram of random frequency offsetting apparatus embodying the present invention.

Referring to FIG. 2, there is illustrated random frequency offsetting apparatus embodying the present invention that may be advantageously utilized in the multi-transmitter simulcast communications system in FIG. 1. In frequency modulated systems, the apparatus in FIG. 2 combines a random noise signal from random noise source 202 with the information signal from the central station 102 in FIG. 1 and applies the combined signals to the frequency modulation input of transmitter 208. In envelope modulated systems, the random noise signal is coupled to the frequency modulation input of transmitter 208, and the information signal is coupled to the envelope modulation input of transmitter 208. The information signal can be digital or analog signals or a combination of both. Random noise source 202 generates the noise signal, which is amplified by amplifier 204 and thereafter filtered by low-pass filter 206. In the preferred embodiment, components of the noise signal having frequencies greater than 100 Hz are attenuated to minimize interference with voice signals which typically have a frequency range from 300 Hz to 3,000 Hz in radio systems. Since low-pass filter 206 only passes signal components in the noise signal having frequencies from 0 to 100 Hz, the filtered noise signal is entirely in the subaudible frequency range. In other applications, low-pass filter 206 may be either a band-pass filter or a high-pass filter depending on the frequency band of the information signal. For example, if the information signal has frequencies in a band from 0 Hz to 2,000 Hz, low-pass filter 206 may be replaced by high-pass filter that attenuates components of the noise signal having a frequencies below 2,000 Hz and passes components of the noise signal having frequencies above 2000 Hz.

The filtered noise signal from low-pass filter 206 is coupled to switch 222 and thereafter to potentiometer 220 and resistor 216 for application to operational amplifier 212. In frequency modulated systems, operational amplifier 212 is arranged as a summing amplifier for summing the signals from resistors 216 and 218. Operational amplifier 212 amplifies the signal from resistor 216 by a factor which is the ratio of resistor 214 to resistor 216 and potentiometer 220, and amplifies the signal from resistor 218 by a factor which is the ratio of resistor 214 to resistor 218. The combined signal from operational amplifier 212 is then applied to the frequency modulation input of transmitter 208.

For other types of transmitter modulation, resistor 216 can be deleted and the filtered noise signal from potentiometer 220 may be coupled by path 226 to the frequency modulation input of transmitter 208. The information signal from operational amplifier 212 is then coupled to the envelope modulation input of transmitter 208. This arrangement of the random frequency offsetting apparatus of the present invention can be used in simulcast transmission systems utilizing amplitude modulation, single-sideband modulation, or other envelope modulation techniques.

Referring to FIG. 2, the operation of the illustrated embodiment of the frequency offsetting apparatus of the present invention will now be described for frequency modulated systems. The amount of amplification of the filtered noise signal by operational amplifier 212 may be adjusted by means of potentiometer 220 for setting of the frequency deviation of transmitter 208 by the filtered noise signal to some pre-selected low deviation, such as ±50 Hz. Since deviation of transmitter 208 by the filtered noise signal is so small, the received information signal at remote stations 110 and 112 in FIG. 1 will be substantially unaffected by the noise signal when the transceiver of the remote station is captured by the RF signal from one of the transmitters 104, 106 and 108 in FIG. 1. Both RF capture and the fact that the filtered noise signal only has frequency components in the subaudible frequency range greatly diminish the audibility of the noise signal. However, in the overlap areas where multi-transmitter interference is occurring, the randomly varying deep cancellation nulls will cause audible pops in the received information signal when a null is momentarily positioned at the same location as a remote station.

The information signal is coupled to delay compensation circuitry 210 which takes into account the different delays introduced by the signal paths from the central station to each transmitter. Delay compensation circuitry 210 is necessary to insure that the modulation of each transmitter is in phase with the modulation of the other transmitters. The characteristics of the delay compensation circuitry 210 are described in my paper referred to hereinabove and in U.S. Pat. No. 4,255,814. The delayed information signal from delay compensation circuitry 210 is coupled via resistor 218 to operational amplifier 212 where it is combined with the filtered noise signal from low-pass filter 206.

The filtered noise signal from low-pass filter 206 may be coupled to operational amplifier 212 directly via path 224 or via switch 222. When switch 222 is present, the filtered noise signal can be selectively coupled to operational amplifier 212 in response to a noise select signal.

One state of the noise select signal can enable switch 222 for coupling the filtered noise signal to operational amplifier 212 during normal operation, and a second state of the select signal can disable switch 222 for decoupling the filtered noise signal from operational amplifier 212 when it is desired to adjust the frequency of transmitter 208 and/or the delay of delay compensation circuitry 210.

Figure 3:
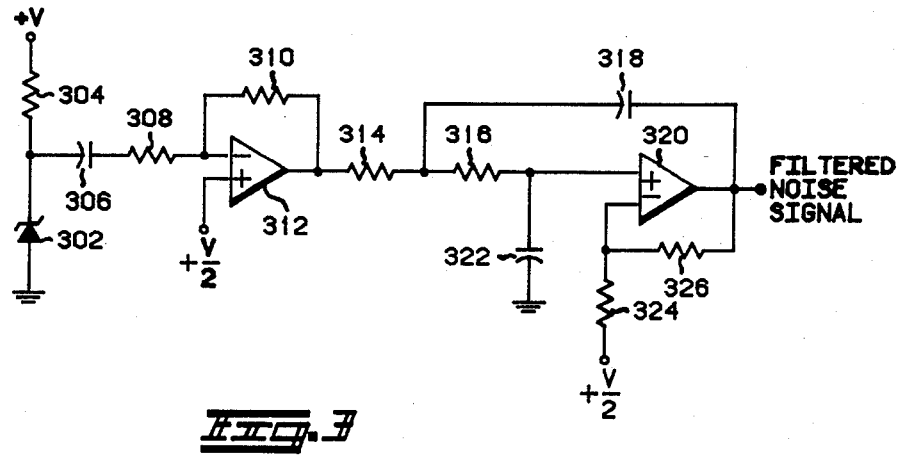
FIG. 3 is a detailed circuit diagram of an embodiment of the random noise source, amplifier and low-pass filter in FIG. 2.

Referring to FIG. 3, there is illustrated a detailed circuit diagram for an embodiment of the random noise source 202, amplifier 204 and low-pass filter 206 in FIG. 2. The random noise source in FIG. 3 is a zener diode 302 which is reverse biased by resistor 304 to operate in the voltage/current "knee" region just preceding the point of rapidly increasing zener current. When a zener diode is biased at this point, it generates a low amplitude noise signal. The noise signal from zener diode 302 is coupled via capacitor 306 and resistor 308 to operational amplifier 312. Operational amplifier 312 amplifies the noise signal by a factor that is the ratio of resistor 310 to resistor 308. Operational amplifier may also include a potentiometer in place of, or in series with, resistor 308 or resistor 310 so that its gain can be adjusted. The output from operational amplifier 312 is coupled to a low-pass filter comprised of operational amplifier 320, resistors 314, 316, 324 and 324 and 326 and capacitors 318 and 322. The low-pass filter has approximately a 100 Hz bandwidth for passing only the low frequency components of the noise signal generated by zener diode 302. The filtered noise signal from amplifier 320 may then be coupled to switch 222 (or directly to potentiometer 220) in FIG. 2 for application to transmitter 208.

Figure 4:
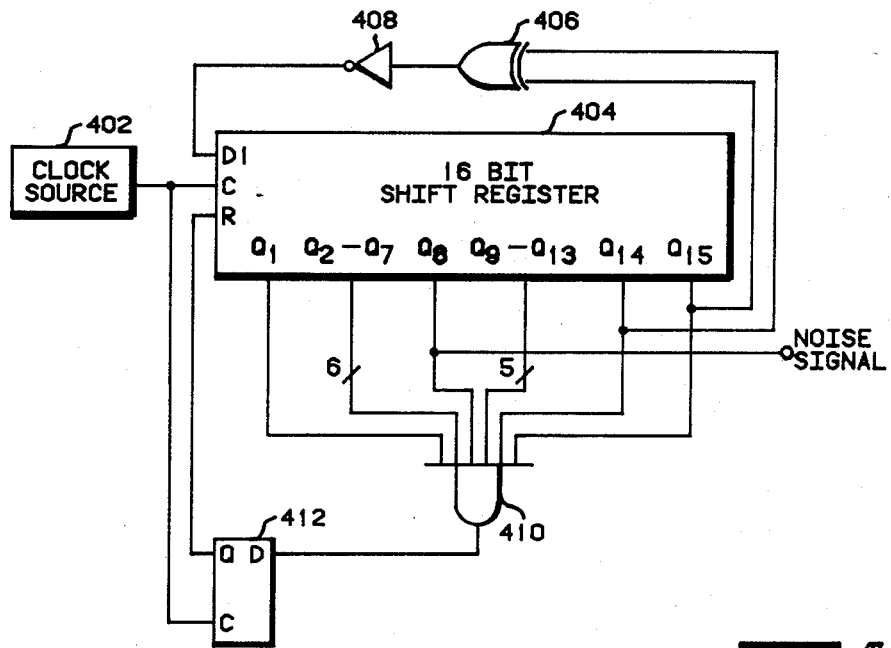
FIG. 4 is a detailed circuit diagram of another embodiment of the random noise source in FIG. 2.

Another suitable embodiment of the random noise source 202 in FIG. 2 is illustrated in FIG. 4. The digital noise generator in FIG. 4 includes a clock source 402 for providing a clock signal and a sixteen-bit shift register 404. Outputs from the 14th and 15th stages $Q_{14}$ and $Q_{15}$ of shift register 404 are coupled to exclusive-OR gate 406, which is in turn coupled by way of inverting gate 408 to the serial input of first stage $Q_1$. The digital noise generator in FIG. 4 generates a pseudorandom digital noise signal at the 8th stage output $Q_8$ (or any other output) of shift register 404, which is characterized by the following equation:

$$f(x) = 1 + x^{14} + x^{15}.$$

In order to prevent the digital noise generator in FIG. 4 from locking up in a state where all stages of shift register 404 have a binary one state, AND gate 410 and flip-flop 412 generate a pulse that resets all stages of shift register 404 to a binary zero state whenever lock up occurs. If the clock signal provided by clock source 402 has a frequency of 300 Hz, the noise signal generated at output $Q_8$ is a serial bit stream having a random bit pattern that is repeated approximately once every 109 seconds. The noise signal from output $Q_8$ may then be coupled to amplifier 204 in FIG. 2 for application to transmitter 208.

In summary, random frequency offsetting circuitry for simulcast transmitters has been described that randomly varies the location of deep cancellation nulls occurring during multi-transmitter interference. By utilizing the present invention communications from simulcasting transmitters to remote stations located in the overlap areas will only be momentarily interrupted by the randomly located deep cancellation nulls. The inventive random frequency offsetting apparatus can be utilized in simulcast systems communicating digital signals, voice signals or digital and voice signals by appropriately tailoring the frequency band of the noise signal that randomly offsets the simulcasting transmitters.

I claim:

1. A system for simultaneously communicating the same information signal from a pair of signal transmission points by way of a radio channel from a central station to at least one remote station having a receiver operating on said radio channel, said system further comprising:
   (a) first transmitting means at one of said pair of signal transmission points producing a first carrier signal, said first transmitting means further including:
      (i) a signal source for generating a noise signal having a random amplitude and random frequency
      (ii) means coupled to the central station for combining the information signal and the noise signal; and
      (iii) means for frequency modulating the first carrier signal with the combined information signal and noise signal; and.
   (b) second transmitting means at the other of said pair of signal transmission points producing a second carrier signal, said second transmitting means further including:
      (i) a signal source for generating a noise signal having a random amplitude and random frequency;
      (ii) means coupled to the central station for combining the information signal and the noise signal; and
      (iii) means for frequency modulating the second carrier signal with the combined information signal and noise signal.

2. The communications system according to claim 1, wherein said first and second transmitting means each further include attenuating means interposed between the noise signal source and the combining means for attenuating the amplitude of components of the noise signal having frequencies that are outside a predetermined frequency range.

3. The communications system according to claim 2, wherein said attenuating means of said first and second transmitting means each comprises low-pass filter means having a predetermined frequency passband.

4. The communication system according to claim 2, wherein said attenuating means of said first and second transmitting means each comprises bandpass filter means having a predetermined frequency passband.

5. The communications system according to claim 2, wherein said attenuating means of said first and second transmitting means each comprises high-pass filter means having a predetermined frequency passband.

6. The communications system according to claim 2, wherein said noise signal source of said first and second transmitting means each comprises zener diode means and biasing means coupled to the zener diode means for biasing the zener diode means at a pre-selected operating point for generating the noise signal.

7. The communications system according to claim 6, wherein said first and second transmitting means each further include amplifying means interposed between the zener diode means and the attenuating means for amplifying the noise signal generated by the zener diode means.

8. The communications system according to claim 7, wherein said first and second transmitting means each further include means for varying the gain of the amplifying means.

9. The communications system according to claim 2, wherein said noise signal source of the first and second transmitting means each comprises means for continuously generating a pseudorandom sequence of binary bits.

10. The communications systems according to claim 1, wherein said combining means of the first and second transmitting means each comprises amplifying means having a first input coupled to the information signal, a second input coupled to the noise signal and an output coupled to the modulating means.

11. The communications system according to claim 10, wherein said amplifying means of the first and second transmitting means each comprises an operational amplifier having a first input coupled by a first resistor to the information signal and by a second resistor to the noise signal, a second input coupled to a predetermined voltage and an output coupled by a feedback resistor to the first input and further coupled to the modulating means.

12. The communications system according to claim 1, 2, 6, 7, 9, 10 or 11, wherein said first and second transmitting means each further include switching means interposed between the noise signal source and the combining means, and a signal source for generating a noise select signal having first and second states, said switching means responsive to the first state of the noise select signal for coupling the noise signal to the combining means and responsive to the second state of the select signal for decoupling the noise signal from the combining means.

13. The communications system according to claim 1, 2, 6, 7, 9, 10 or 11, wherein said first and second transmitting means each further include second attenuating means interposed between the noise signal source and the combining means for attenuating the amplitude of the noise signal by a pre-selected amount.

14. A method of randomly offsetting a predetermined frequency of the carrier signals of a plurality of transmitters each producing a carrier signal having the same predetermined frequency and simultaneously transmitting the same information signal from a central station to at least one remote station having a receiver tuned to the predetermined frequency of the carrier signals, said method comprising at each transmitter the steps of:
(a) generating a noise signal having a random amplitude and random frequency;
(b) combining the information signal and the noise signal; and
(c) frequency modulating the carrier signal produced by the transmitter with the combined information signal and noise signal, whereby amplitude null locations, caused by cancellation of substantially oppositely phased carrier signals transmitted by at least two of the transmitters, is randomly varied.

15. The method according to claim 14, wherein said step (a) further includes the step of attenuating the amplitude of the noise signal by a predetermined amount.

16. The method according to claim 14 or 15, wherein said step (a) further includes the step of attenuating the amplitude of components of the noise signal having frequencies that are outside a predetermined frequency range.

17. The method according to claim 14 or 15, wherein said step (a) further includes the step of low-pass filtering the noise signal.

18. The method according to claim 14 or 15, wherein said step (a) further includes the step of bandpass filtering the noise signal.

19. The method according to claim 14 or 15, wherein said step (a) further includes the step of high-pass filtering the noise signal.

20. A system for simultaneously communicating the same information signal from a pair of signal transmission points by way of a radio channel from a central station to at least one remote station having a receiver operating on said radio channel, said system further comprising:
(a) first transmitting means producing a first carrier signal, said first transmitting means further including:
(i) a signal source for generating a noise signal having a random amplitude and random frequency;
(ii) means coupled to the central station for envelope modulating the first carrier signal with the information signal and for frequency mmodulating the first carrier signal with the noise signal, whereby a first combined envelope and frequency modulated carrier signal is provided from said first transmitting means; and
(b) second transmitting means producing a second carrier signal, said second transmitting means further including:
(i) a signal source for generating a noise signal having a random amplitude and random frequency;
(ii) means coupled to the central station for envelope modulating the second carrier signal with the information signal and for frequency modulating the second carrier signal with the noise signal, whereby a second combined envelope and frequency modulated carrier signal is provided from said second transmitting means.

21. The communications system according to claim 20, wherein said first and second transmitting means each further include attenuating means interposed between the noise signal source and the frequency modulating means for attenuating the amplitude of components of the noise signal having frequencies that are outside a predetermined frequency range.

22. The communications system according to claim 21, wherein said attenuating means of said first and second transmitting means each comprises low-pass filter means having a predetermined frequency passband.

23. The communication system according to claim 21, wherein said attenuating means of said first and second transmitting means each comprises bandpass filter means having a predetermined frequency passband.

24. The communications system according to claim 21, wherein said attenuating means of said first and second transmitting means each comprises high-pass filter means having a predetermined frequency passband.

25. The communications system according to claim 21, wherein said noise signal source of said first and second transmitting means each comprises zener diode means and biasing means coupled to the zener diode means for biasing the zener diode means at a preselected operating point for generating the noise signal.

26. The communications system according to claim 25, wherein said first and second transmitting means each further include amplifying means interposed between the zener diode means and the attenuating means for amplifying the noise signal generated by the zener diode means.

27. The communications system according to claim 26, wherein said first and second transmitting means each further include means for varying the gain of the amplifying means.

28. The communications system according to claim 21, wherein said noise signal source of the first and second transmitting means each comprises means for continuously generating a pseudorandom sequence of binary bits.

29. The communications system according to claim 20, 21, 25, 26, or 28, wherein said first and second transmitting means each further include switching means interposed between the noise signal source and the frequency modulating means, and a signal source for generating a noise select signal having first and second states, said switching means responsive to the first state of the noise select signal for coupling the noise signal to the frequency modulating means and responsive to the second state of the select signal for decoupling the noise signal from the frequency modulating means.

30. The communications system according to claim 20, 21, 25, 26, or 28, wherein said first and second transmitting means each further include second attenuating means interposed between the noise signal source and the frequency modulating means for attenuating the amplitude of the noise signal by a pre-select amount.

31. A method of randomly offsetting a predetermined frequency of the carrier signals of a plurality of transmitters each producing a carrier signal having the same predetermined frequency and simultaneously transmitting the same information signal from a central station to at least one remote station having a receiver tuned to the predetermined frequency of the carrier signals, said method comprising at each transmitter the steps of:
 (a) generating a noise signal having a random amplitude and random frequency;
 (b) envelope modulating the carrier signal produced by the transmitter with the information signal; and
 (c) frequency modulating the carrier signal produced by the transmitter with the noise signal to provide a combined envelope and frequency modulated carrier signal for transmission, whereby amplitude null locations caused by cancellation of substantially oppositely phased carrier signals transmitted by at least two of the transmitters is randomly varied.

32. The method according to claim 31, wherein said step (a) further includes the step of attenuating the amplitude of the noise signal by a predetermined amount.

33. The method according to claim 31 or 32, wherein said step (a) further includes the step of attenuating the amplitude of components of the noise signal having frequencies that are outside a predetermined frequency range.

34. The method according to claim 31 or 32, wherein said step (a) further includes the step of low-pass filtering the noise signal.

35. The method according to claim 31 or 32, wherein said step (a) further includes the step of bandpass filtering the noise signal.

36. The method according to claim 31 or 32, wherein said step (a) further includes the step of high-pass filtering the noise signal.

37. In a communication system with a plurality of fixed transmitting stations connected to a common source of voice-frequency message signals to be modulated upon respective carrier waves of substantially identical frequency for simultaneous radiation toward a mobile receiver capable of detecting signals in the voice-frequency range,
 the improvement wherein each of said transmitting stations comprises:
 a generator of low-frequency dephasing signals varying in a generally random manner;
 filter means connected to said generator for cutting off said dephasing signals at an upper frequency below the voice-frequency range;
 a local oscillator generating a high-frequency carrier wave;
 adding means with inputs connected to said filter means and to said source for producing a composite signal;
 circuit means with inputs connected to said adding means and to said oscillator for modulating said carrier wave with said composite signal; and
 transmitter means connected to said circuit means for radiating the modulated carrier wave.

38. The communications system according to claim 37, wherein said dephasing signal generator comprises zener diode means and biasing means coupled to the zener diode means for biasing the zener diode means at a pre-selected operating point for generating the dephasing signal.

39. The communications system according to claim 37, further including amplifying means interposed between the dephasing signal generator and the filter means for amplifying the dephasing signal.

40. The communications system according to claim 37, wherein said dephasing signal generator comprises means for continuously generating a pseudorandom sequence of binary bits.

41. The communications systems according to claim 37, wherein said adding means comprises amplifying means having a first input coupled to the dephasing signal generator, a second input coupled to the filter means and an output coupled to the circuit means.

42. The communications system according to claim 37, further including attenuating means interposed between the dephasing signal generator and the adding means for attenuating the amplitude of the dephasing signal by a pre-selected amount.

43. In a communication system with a plurality of fixed transmitting stations connected to a common source of voice-frequency message signals to be modulated upon respective carrier waves of substantially identical frequency for simultaneous radiation toward a mobile receiver capable of detecting signals in the voice-frequency range,
 the improvement wherein each of said transmitting stations comprises:
 a generator of low-frequency dephasing signals varying in a generally random manner;
 filter means connected to said generator for cutting off said dephasing signals at an upper frequency below the voice-frequency range;

adding means with inputs connected to said filter means and to said source for producing a composite signal; and circuit means with an input connected to said adding means for modulating said carrier wave with said composite signal.

44. The communications system according to claim 43, wherein said dephasing signal generator comprises zener diode means and biasing means coupled to the zener diode means for biasing the zener diode means at a pre-selected operating point for generating the dephasing signal.

45. The communications system according to claim 43, further including amplifying means interposed between the dephasing signal generator and the filter means for amplifying the dephasing signal.

46. The communications system according to claim 43, wherein said dephasing signal generator comprises means for continuously generating a pseudorandom sequence of binary bits.

47. The communications systems according to claim 43, wherein said adding means comprises amplifying means having a first input coupled to the dephasing signal generator, a second input coupled to the filter means and an output coupled to the circuit means.

48. The communications system according to claim 43, further including attenuating means interposed between the dephasing signal generator and the adding means for attenuating the amplitude of the dephasing signal by a pre-selected amount.

* * * * *